(12) United States Patent
Jiwariyavej et al.

(10) Patent No.: US 11,509,190 B2
(45) Date of Patent: Nov. 22, 2022

(54) MOTOR AND METHOD OF PRODUCING THE SAME

(71) Applicant: MITSUBISHI HEAVY INDUSTRIES ENGINE & TURBOCHARGER, LTD., Sagamihara (JP)

(72) Inventors: Vissuta Jiwariyavej, Tokyo (JP); Yukio Yamashita, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 237 days.

(21) Appl. No.: 16/612,986

(22) PCT Filed: Nov. 20, 2017

(86) PCT No.: PCT/JP2017/041622
§ 371 (c)(1),
(2) Date: Nov. 12, 2019

(87) PCT Pub. No.: WO2019/097710
PCT Pub. Date: May 23, 2019

(65) Prior Publication Data
US 2020/0177050 A1 Jun. 4, 2020

(51) Int. Cl.
*H02K 5/24* (2006.01)
*H02K 5/20* (2006.01)
*H02K 9/22* (2006.01)
*H02K 15/14* (2006.01)

(52) U.S. Cl.
CPC .................. *H02K 5/24* (2013.01); *H02K 5/20* (2013.01); *H02K 9/22* (2013.01); *H02K 15/14* (2013.01)

(58) Field of Classification Search
CPC .. H02K 5/20; H02K 5/24; H02K 9/22; H02K 9/223; H02K 15/14
See application file for complete search history.

(56) References Cited

U.S. PATENT DOCUMENTS

| 6,798,094 B2 | 9/2004 | Hirsou et al. |
| 2008/0036309 A1 | 2/2008 | Toyama et al. |
| 2011/0234028 A1 | 9/2011 | Iwasaki et al. |
| 2013/0119832 A1 | 5/2013 | Nagao et al. |

FOREIGN PATENT DOCUMENTS

| CN | 101785170 A | 7/2010 |
| CN | 106849468 A | 6/2017 |
| JP | 61-52136 A | 3/1986 |

(Continued)

OTHER PUBLICATIONS

Hashidate, Machine Translation of JP2007236045, Sep. 2007 (Year: 2007).*

(Continued)

*Primary Examiner* — Quyen P Leung
*Assistant Examiner* — Eric Johnson
(74) *Attorney, Agent, or Firm* — Birch, Stewart, Kolasch & Birch, LLP

(57) ABSTRACT

A motor includes: a motor housing; a stator disposed inside the motor housing and supported by the motor housing; and a thermally conductive sheet disposed so as to fill a gap in a radial direction or an axial direction between the motor housing and the stator.

13 Claims, 4 Drawing Sheets

(56) References Cited

FOREIGN PATENT DOCUMENTS

| | | | |
|---|---|---|---|
| JP | 08149756 A | * | 6/1996 |
| JP | 11-240706 A | | 9/1999 |
| JP | 2007-507195 A | | 3/2007 |
| JP | 2007-236045 A | | 9/2007 |
| JP | 2008-43133 A | | 2/2008 |
| JP | 2010-38400 A | | 2/2010 |
| JP | 2010-38470 A | | 2/2010 |
| JP | 2010038470 A | * | 2/2010 |
| JP | 2013-106366 A | | 5/2013 |
| JP | 2017011886 A | * | 1/2017 |
| JP | 2017-130490 A | | 7/2017 |
| WO | WO 2009/025093 A1 | | 2/2009 |

OTHER PUBLICATIONS

Yonemori, Machine Translation of JP2017011886, Jan. 2017 (Year: 2017).*

Kawamata, Machine Translation of JP08149756, Jun. 1996 (Year: 1996).*

Noguchi, Machine Translation of JP2010038470, Feb. 2010 (Year: 2010).*

Hashidate, Machine Translation of WO2009025093, Feb. 2009 (Year: 2009).*

Office Action dated Jul. 2, 2021 issued in counterpart Chinese Application No. 201780090187.0 with an English Translation.

Extended European Search Report for European Application No. 17932413.2, dated May 19, 2020.

International Preliminary Report on Patentability and Written Opinion of the International Searching Authority for International Application No. PCT/JP2017/041622, dated Jun. 4, 2020, with English translation.

International Search Report for International Application No. PCT/JP2017/041622, dated Feb. 6, 2018.

Office Action dated Feb. 16, 2021 issued in counterpart Japanese Application No. 2019-553660 with English Machine Translation.

* cited by examiner

MOTOR AND METHOD OF PRODUCING THE SAME

TECHNICAL FIELD

The present disclosure relates to a motor and a method of producing the motor.

BACKGROUND ART

For an electric supercharger driven by a motor, it is necessary to address heat generation of a motor body housed inside a motor housing, and noise that occurs from transmission of vibration of the motor body to the outside of the motor housing.

A cooling method may be adopted to address heat generation, for instance, which includes filling a thermally conductive member made of a thermally conductive material such as metal in the gap between the stator and the motor housing such that heat of the motor body is dissipated outside via the thermally conductive member. However, with the above method, vibration of the motor may be transmitted to the outside of the motor housing via the thermally conductive member, and the noise cannot be reduced.

On the other side, when a flexible material is interposed between the stator and the motor housing to suppress vibration, the noise problem can be solved, but the motor cooling effect deteriorates.

Patent Document 1 discloses a technique to enhance the cooling effect achieved by heat dissipation of the motor body by filling a thermally conductive resin in the gap between the stator and the motor housing.

CITATION LIST

Patent Literature

Patent Document 1: U.S. Pat. No. 6,798,094B

SUMMARY

Problems to be Solved

For a motor equipped with an integrated motor housing, it is not easy to interpose a thermally conductive resin in the gap between the stator and the motor housing during the production process as in Patent Document 1. Thus, for instance, the motor housing may be divided into two housing sections along the radial direction, and the stator may be inserted into one of the housing sections while a thermally conductive resin is held between the stator and the housing section.

However, when a thermally conductive resin is used, a high degree of friction occurs between the stator and the housing section. Thus, the stator cannot be easily inserted into the housing section. Furthermore, the heat dissipation effect of a thermally conductive resin is not so high.

In some embodiments, an object is to propose a motor and a simplified method of producing the motor, whereby it is possible to improve both of the motor cooling effect and the vibration suppression effect.

Solution to the Problems (1) According to an embodiment, a motor includes: a motor housing; a stator disposed inside the motor housing and supported by the motor housing; and a thermally conductive sheet disposed so as to fill a gap in a radial direction or an axial direction between the motor housing and the stator.

With the above configuration (1), the thermally conductive sheet is packed in the gap in the radial direction or the axial direction formed between the motor housing and the stator, and thus heat generated by the motor body is dissipated outside from the motor housing via the thermally conductive sheet, whereby it is possible to enhance the cooling effect.

(2) In an embodiment, in the above configuration (1), the thermally conductive sheet includes a graphite sheet.

With the above configuration (2), a graphite sheet has a high thermal conductivity and a high tensile modulus of elasticity and thus is elastic, whereby it is possible to improve both of the cooling effect from heat dissipation of the motor and the vibration suppression effect.

(3) In an embodiment, in the above configuration (1) or (2), the thermally conductive sheet includes a plurality of thermally conductive sheets which are laminated so as to be slidable on one another, the plurality of thermally conductive sheets forming a laminated body.

With the above configuration (3), with the thermally conductive sheet being a laminated body including a plurality of thermally conductive sheets, the sheets contain air or the like therebetween and have elasticity, whereby it is possible to suppress transmission of vibration of the stator to the motor housing.

Furthermore, by adjusting the shape, size, and number of the sheets that constitute the laminated body, the shape, size, and thickness of the laminated body can be adjusted easily, and it is possible to fill the gap in the radial direction or the axial direction easily in accordance with the shape and size of the gap in the radial direction or the axial direction between the motor housing and the stator.

Furthermore, when performing assembly by inserting the stator into the motor housing with the laminated body being interposed between the motor housing and the stator, it is possible to insert the stator into the motor housing easily by utilizing the slidability between the thermally conductive sheets, and thus the motor can be assembled easily.

(4) In an embodiment, in any one of the above configurations (1) or (3), the motor housing has a passage to which a cooling medium is to be supplied, the passage being formed on the motor housing at an outer side, in the radial direction or the axial direction, of the thermally conductive sheet.

With the above configuration (4), the heat generated by the motor and transmitted to the motor housing via the thermally conductive sheet or the laminated body of the thermally conductive sheet is cooled by the cooling medium supplied to the passage, and thus it is possible to promote dissipation of heat from the motor body to the motor housing, and improve the cooling effect of the motor.

(5) In an embodiment, in the above configuration (4), the thermally conductive sheet includes a plurality of thermally conductive sheets disposed discretely on a part of an axial-directional end surface or an outer peripheral surface of the stator, and the motor housing has a passage to which the cooling medium is to be supplied, the passage being formed on the motor housing at an outer side, in the radial direction or the axial direction, of each of the thermally conductive sheets.

The shape, size, and thickness of the thermally conductive sheet can be adjusted flexibly by laminating a plurality of thermally conductive sheets, and thus even in a case where the thermally conductive sheets are disposed discretely as in the above configuration (5), it is possible to place the thermally conductive sheets easily at desired positions. Accordingly, it is possible to distribute the thermally conductive sheets focusing on spots where cooling is necessary, which makes it possible to improve the cooling effect and reduce costs.

(6) In an embodiment, in any one of the above configurations (1) or (5), a recess portion having an arc shape or an annular shape is formed on an outer peripheral surface or an axial-directional end surface of the stator, and the thermally conductive sheet is disposed in the recess portion.

With the above configuration (6), by placing the thermally conductive sheet in the recess portion, it is possible to fix the thermally conductive sheet at a desired position on the outer peripheral surface of the stator without misplacement, when assembling the motor housing and the stator.

(7) In an embodiment, in any one of the above configurations (1) or (6), the thermally conductive sheet has a thermal conductivity of not lower than 0.5 W/(m·K).

With the above configuration (7), with the thermally conductive sheet having a thermal conductivity of not lower than 0.5 W/(m·K), it is possible to improve the heat dissipation effect of transmitting heat of the motor body to the motor housing.

(8) In an embodiment, in any one of the above configurations (1) or (7), the thermally conductive sheet has a tensile modulus of elasticity of not lower than 1000 MPa.

With the above configuration (8), with the thermally conductive sheet having a tensile modulus of elasticity of not lower than 1000 MPa, it is possible to suppress transmission of vibration of the stator body to the outside of the motor housing, and reduce vibration of the motor.

(9) According to an embodiment, a method of producing a motor includes: an assembling step of assembling a stator to a motor housing so that a thermally conductive sheet fills a gap in a radial direction or an axial direction between the motor housing and the stator.

The motor produced by the above method (9) includes the thermally conductive sheet filling the gap between the motor housing and the stator, and thus it is possible to dissipate heat generated by the motor body to the outside of the motor housing and enhance the effect to cool the motor, as well as to suppress transmission of vibration of the stator to the motor housing.

(10) In an embodiment, the above method (9) further includes a first placement step of laminating a plurality of the thermally conductive sheets to form a laminated body, and placing the plurality of thermally conductive sheets so as to be offset from one another in the axial direction so that axial-directional end portions of the plurality of thermally conductive sheets are positioned closer to an axial-directional end surface side of the stator with distance toward an outer side in the radial direction. The assembling step includes an insertion step of moving a housing section which constitutes the motor housing relative to the stator in the axial direction from the axial-directional end surface side of the stator, and inserting the stator into the housing section while causing a radially outermost thermally conductive sheet of the plurality of thermally conductive sheets to be in slidable contact with an inner peripheral surface of the housing section.

According to the above method (10), in the first placement step, the plurality of thermally conductive sheets are disposed so as to be offset in the axial direction, and in the insertion step, the stator is inserted into the housing section while causing the radially outermost thermally conductive sheet to be in slidable contact with the inner peripheral surface of the housing section, whereby it is possible to align the axial-directional end surfaces of the thermally conductive sheets in the radial direction naturally after assembling, thanks to the friction force generated between the housing section and the radially outermost thermally conductive sheet, and the mutual friction force generated between the thermally conductive sheets.

Furthermore, the shape, size, and thickness of the laminated body can be adjusted easily, and it is possible to place the laminated body in the gap easily in accordance with the shape and size of the gap in the radial direction between the motor housing and the stator.

Furthermore, when performing assembly by inserting the stator into the motor housing with the laminated body being interposed between the motor housing and the stator, it is possible to insert the stator into the motor housing easily by utilizing the slidability between the thermally conductive sheets.

(11) In an embodiment, in the above method (10), the assembling step includes causing the axial-directional end portions of the plurality of thermally conductive sheets to be in contact with a contact surface formed on the housing section in a direction orthogonal to the axial direction of the stator, and aligning the axial-directional end portions of the respective thermally conductive sheets to be flush in the axial direction of the stator.

According to the above method (11), in the assembling step, by causing the axial-directional end portions of the thermally conductive sheets to be in contact with the contact surface, it is possible to align the axial-directional end portions of the thermally conductive sheets to be flush in the radial direction reliably.

(12) In an embodiment, the above method (9) further includes a second placement step of placing the thermally conductive sheet on a peripheral surface of one of the motor housing or the stator. The assembling step includes assembling, after the second placement step, the one of the motor housing or the stator to the other one of the motor housing or the stator by fitting.

According to the above method (12), by assembling the motor housing and the stator by shrink fitting or cold fitting, for instance, the motor housing does not need to be produced as halved sections even in a case where the thermally conductive sheet is to be placed on the peripheral surface of one of the motor housing or the stator, whereby it is possible to assemble the motor easily.

(13) In an embodiment, in the above method (12), the assembling step includes placing the thermally conductive sheet in a recess portion having an arc shape or an annular shape formed on an outer peripheral surface of the stator.

According to the above method (13), by placing the thermally conductive sheet in the recess portion, it is possible to fix the thermally conductive sheet at a desired position on the outer peripheral surface of the stator without misplacement, when producing the motor.

Advantageous Effects

According to some embodiments, it is possible to improve both of the motor cooling effect and the vibration suppression effect, and produce the motor easily.

DETAILED DESCRIPTION

Figure 1A:
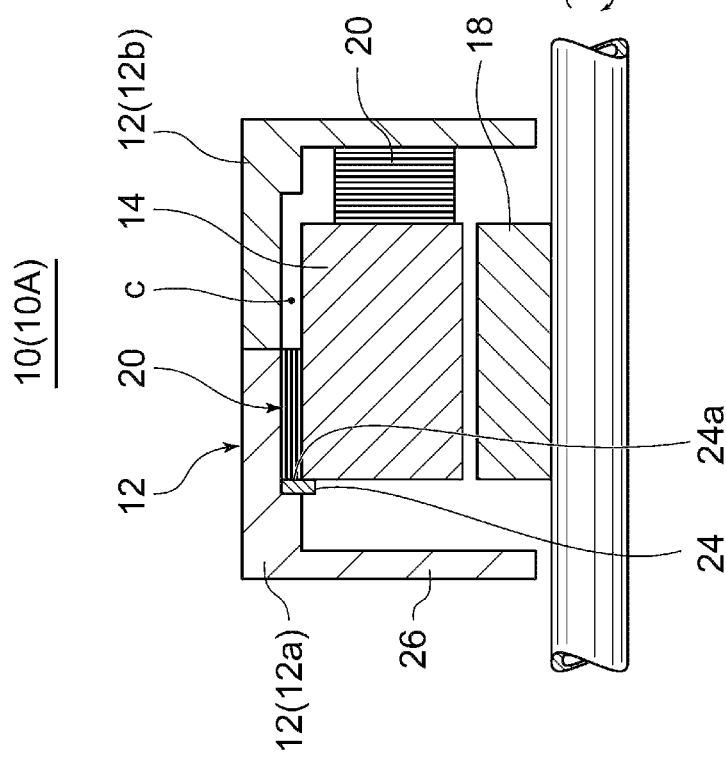
FIGS. 1A and 1B are cross-sectional diagrams showing steps of producing a motor according to an embodiment.

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIGS. 1 to 4 depict a motor 10 (10A, 10B, 10C) according to some embodiments.

In FIGS. 1 to 4, the motor 10 includes a stator 14 disposed inside a motor housing 12, and the stator 14 is supported by the motor housing 12. A rotational shaft 16 is disposed at the center of the motor housing 12, and a rotor 18 is fixed to the outer peripheral surface of the rotational shaft 16, at an axial-directional position that faces the stator 14. The rotational shaft 16 is rotated by a magnetic force generated by electric current that flows through a stator coil (not depicted). A thermally conductive sheet 20a is disposed in a gap 'c', in the radial direction or the axial direction, between the motor housing 12 and the stator 14. The thermally conductive sheet 20a is disposed so as to be in contact with the inner peripheral surface of the motor housing 12 and the outer peripheral surface of the stator 14, or with the inner side surface of the motor housing 12 and the side surface of the stator 14, and so as to fill the gap 'c' in the radial direction or the axial direction.

In an embodiment, the stator 14 is supported while being in contact with a support member (not depicted) formed inside the motor housing 12.

With the above configuration, the thermally conductive sheet 20a is packed so as to fill the gap 'c' in the radial direction or the axial direction formed between the motor housing 12 and the stator 14, and thus heat generated by the motor body is dissipated outside from the motor housing 12 via the thermally conductive sheet 20a having a high thermal conductivity. Accordingly, it is possible to enhance the effect to cool the motor body.

In an embodiment, as the material of the thermally conductive sheet 20a, a material that has a specific structure formed of epoxy resin, acrylic resin, silicon resin, or the like, and has a certain level of thermal conductivity or higher, may be used.

In an embodiment, the thermally conductive sheet 20a is constituted by a graphite sheet. A graphite sheet has a high thermal conductivity both in the surface direction and the thickness direction, and also has a high tensile modulus of elasticity and thus is elastic. Thus, it is possible to improve the heat dissipation effect and the vibration suppression effect for the motor 10.

In an embodiment, a plurality of thermally conductive sheets 20a are not bonded to one another but laminated so as to be slidable, thus forming a laminated body 20.

Accordingly, the laminated body 20 formed by laminating a plurality of sheets has elasticity thanks to air or the like that exists between the sheets, whereby it is possible to suppress transmission of vibration of the stator 14 to the motor housing 12.

Furthermore, by adjusting the shape, size, and number of the sheets that constitute the laminated body 20, the shape, size, and thickness of the laminated body 20 can be adjusted easily, and it is possible to fill the gap easily in accordance with the shape and size of the gap 'c' in the radial direction or the axial direction between the motor housing 12 and the stator 14.

Furthermore, even when the gap 'c' in the radial direction or the axial direction is packed by the laminated body 20 of the thermally conductive sheet 20a, it is possible to easily insert the stator 14 into the motor housing 12 by utilizing the slidability between the respective thermally conductive sheets, and thereby the motor 10 can be assembled easily.

In an embodiment, when the number of the thermally conductive sheets 20a is adjusted such that the thickness of the laminated body 20 is not smaller than the gap 'c' of the radial direction or the axial direction and the stator 14 is inserted in to the motor housing 12, the both side surfaces of the laminated body 20 are pressure-welded to the motor housing 12 and the stator 14.

Accordingly, it is possible to increase the amount of heat transmission that passes the laminated body 20, and enhance the effect to cool the motor 10.

Figure 2:
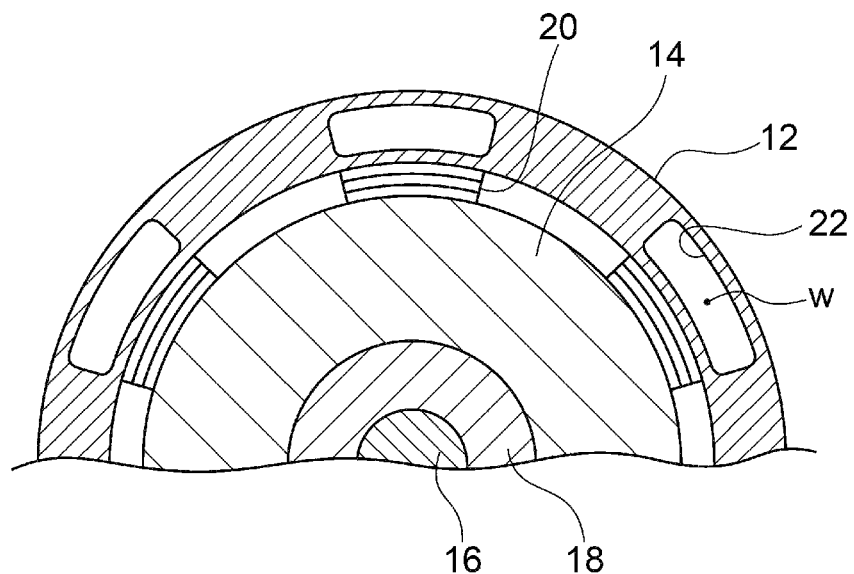
FIG. 2 is a lateral cross-sectional view of a motor according to an embodiment.
Figure 3:
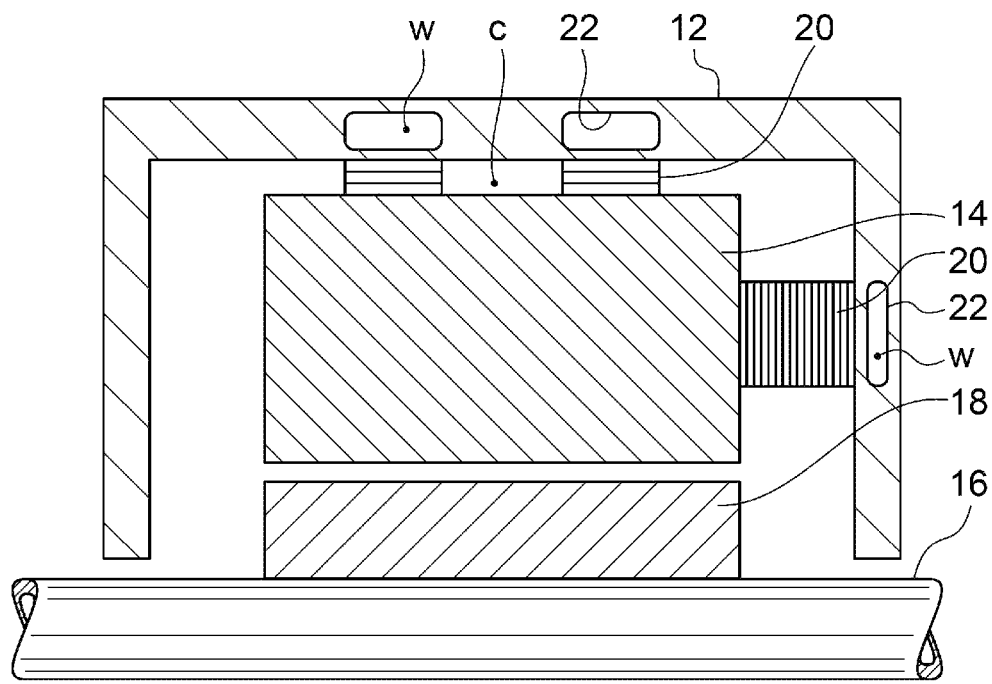
FIG. 3 is a vertical cross-sectional view of a motor according to an embodiment.

In an embodiment, like the motor 10 (10B) depicted in FIGS. 2 and 3, a cooling passage 22 to which a cooling medium 'w' is supplied is formed at a portion of the motor housing 12 positioned at the outer side, in the radial direction or the axial direction, of the laminated body 20.

According to this embodiment, the heat generated by the motor body and transmitted to the motor housing 12 via the laminated body 20 is cooled at the cooling passage 22, and thus it is possible to increase the dissipation amount of heat of the motor body that is dissipated outside the motor housing, and improve the cooling effect of the motor 10.

In an embodiment, as depicted in FIGS. 2 and 3, a plurality of laminated bodies 20 are disposed discretely on a part of the axial-directional end surface or the outer peripheral surface of the stator 14. Furthermore, the cooling passage 22 is formed on the motor housing 12 at the outer side, in the radial direction or the axial direction, of each of the laminated bodies 20.

The shape and size of each laminated body 20 can be adjusted flexibly, and thus it is possible to distribute laminated bodies 20 discretely at desired positions. Accordingly, it is possible to place the laminated bodies 20 focusing on spots where cooling is necessary, which makes it possible to improve the cooling effect and reduce costs. Furthermore, it is possible to position the laminated bodies 20 flexibly at desired positions, and thus it is possible to increase the design flexibility of the motor housing 12.

In a comparative example, it is assumed that resin is packed at the installation positions of the respective laminated bodies 20 depicted in FIGS. 2 and 3, as disclosed in Patent Document 1. In the comparative example, it is necessary to inject melted resin into the gap 'c' in the radial direction or the axial direction and harden the melted resin, and it is difficult to determine the position of the resin precisely. Furthermore, it is difficult to align the axial-directional end portion and the radial-directional end surface of the resin to be flush.

On the contrary, in the present embodiment, it is possible to prepare each laminated body 20 having desired shape and thicknesses outside the motor housing, and thus the positions of the plurality of laminated bodies 20 can be determined easily.

In an embodiment, as depicted in FIGS. 2 and 3, the front surfaces of the respective thermally conductive sheets 20a are placed along the peripheral surface or the side surface of the motor housing 12 and the stator 14. Accordingly, the thermally conductive sheets 20a can be placed easily in the gap 'c' in the radial direction or the axial direction.

Figure 4A:
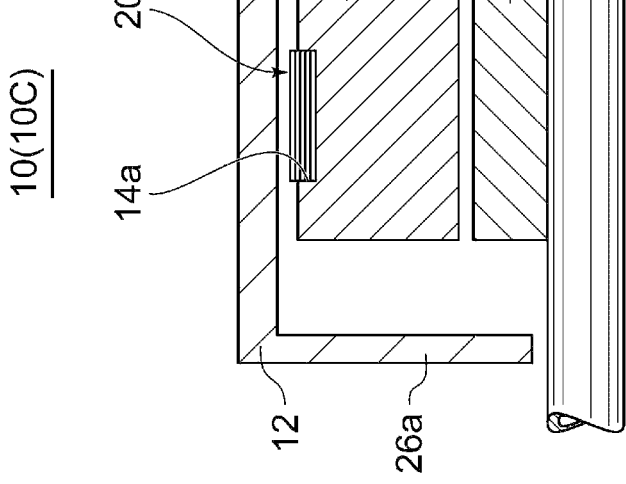
FIGS. 4A and 4B are cross-sectional diagrams showing steps of producing a motor according to an embodiment.
Figure 4B:
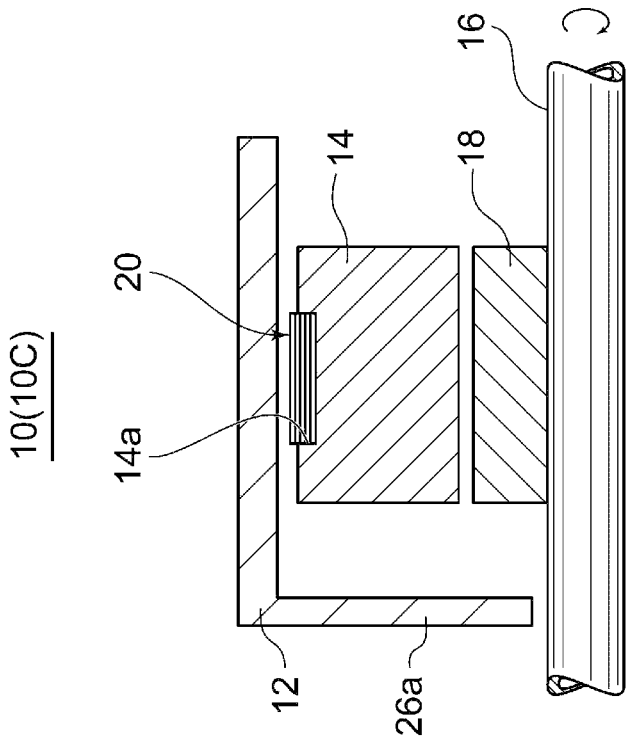

In an embodiment, like the motor 10 (10C) depicted in FIG. 4, a recess portion 14a having an arc shape or an annular shape is formed on the outer peripheral surface or the axial-directional end surface of the stator 14, and the thermally conductive sheet 20a or the laminated body 20 is housed in the recess portion 14a. For instance, in a case where the thermally conductive sheet 20a or the laminated body 20 is an annular-shaped laminated body that is disposed over the entire periphery of the outer peripheral surface of the stator 14, a recess portion 14a having an annular shape is formed on the outer peripheral surface of the stator 14. In a case where a plurality of thermally conductive sheets 20a or laminated bodies 20 having an arc shape are placed discretely on the outer peripheral surface of the stator 14, a plurality of recess portions 14a having an arc shape are formed on the outer peripheral surface of the stator 14.

According to the above embodiment, by placing the laminated body 20 in the recess portion 14a, when assembling the motor housing 12 and the stator 14, it is possible to fix the thermally conductive sheet 20a or the laminated body 20 at a desired position on the outer peripheral surface of the stator 14 without misplacement.

In an embodiment, the thermally conductive sheet 20a has a thermal conductivity of 0.5 W/(m·K) or higher. Accordingly, it is possible to improve the dissipation effect of transmitting heat of the motor body to the motor housing 12, and enhance the effect to cool the motor 10.

In an embodiment, the thermally conductive sheet 20a has a tensile modulus of elasticity of 1000 MPa or higher. Accordingly, it is possible to suppress transmission of vibration of the motor body to the outside of the motor housing, and reduce vibration of the motor 10.

Figure 5:
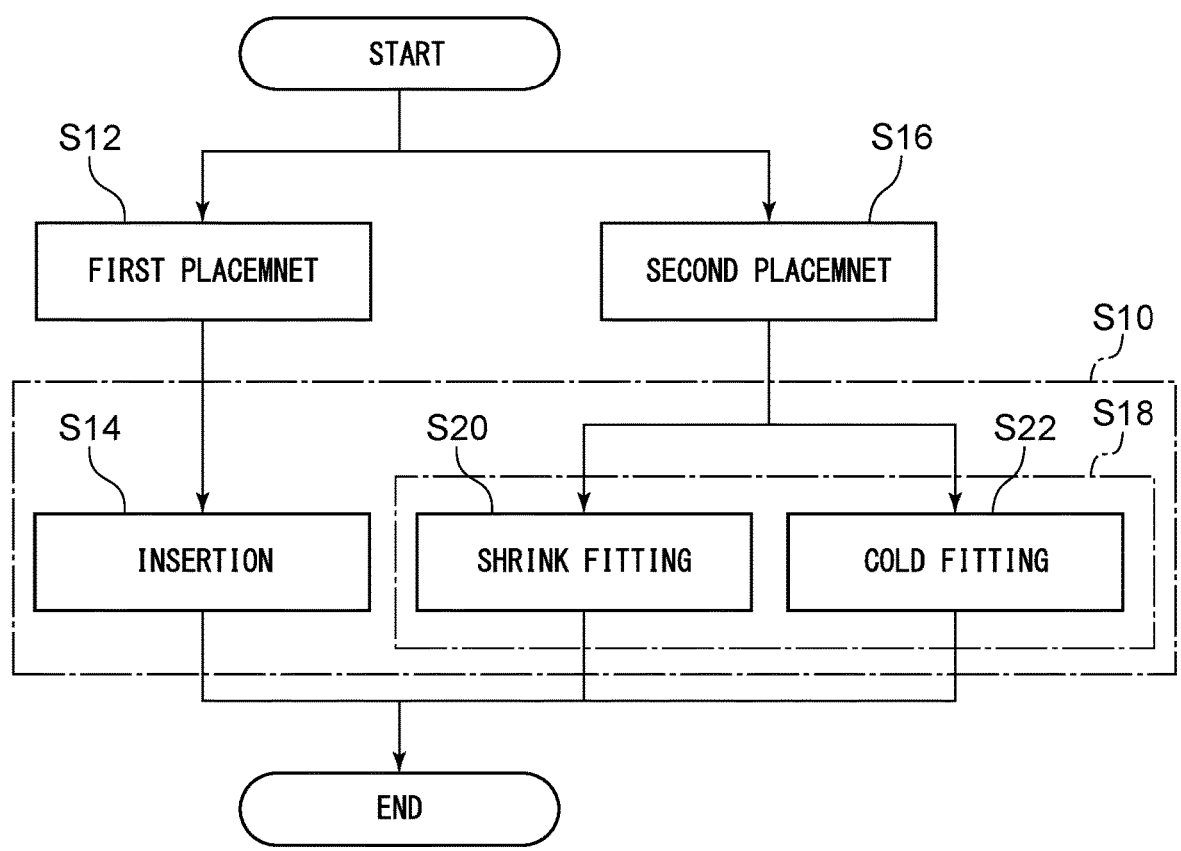
FIG. 5 is a flowchart of a method of producing a motor according to an embodiment.

As depicted in FIG. 5, according to an embodiment, a method of producing a motor includes assembling the stator 14 to the motor housing 12 so that the thermally conductive sheet 20a fills the gap 'c' in the radial direction or the axial direction between the motor housing 12 and the stator 14 (assembling step S10).

The motor produced by the above method includes the thermally conductive sheet 20a so as to fill the gap 'c' in the radial direction or the axial direction between the motor housing 12 and the stator 14, and thus it is possible to dissipate heat generated by the motor body to the outside of the motor housing and enhance the effect to cool the motor, as well as to suppress transmission of vibration of the stator 14 to the motor housing 12.

Figure 1B:
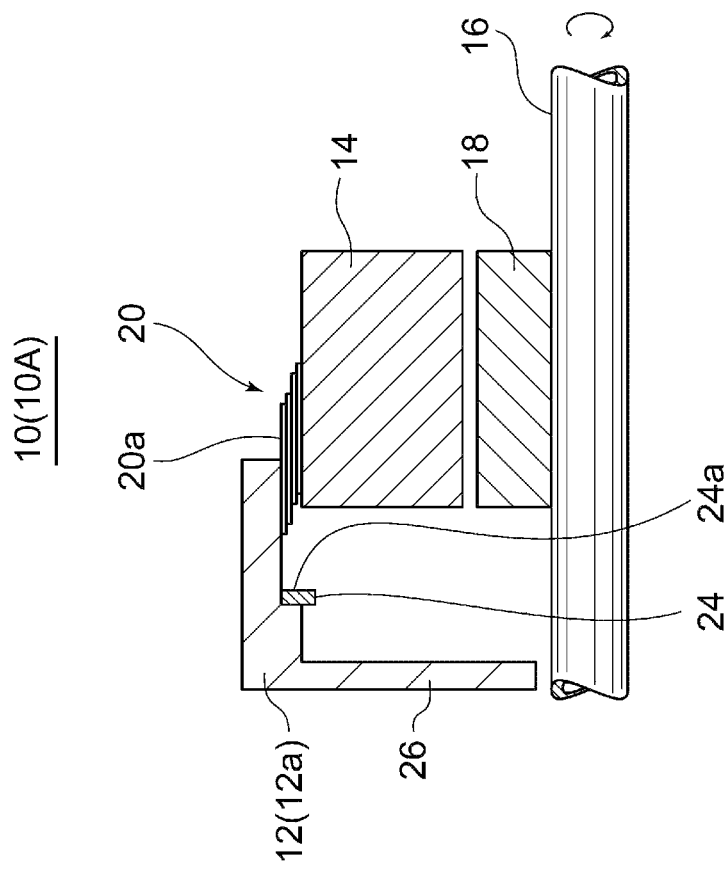

In an embodiment, in the first placement step S12 depicted in FIG. 5, a plurality of thermally conductive sheets 20a are laminated to form the laminated body 20. In the first placement step S12, as depicted in FIG. 1, the plurality of thermally conductive sheets 20a are placed offset from one another in the axial direction so that the axial-directional end portions of the thermally conductive sheets 20a are positioned closer to an axial-directional end surface of the stator 14 with distance toward the outer side in the radial direction.

Next, in the assembling step S10, the housing section 12 (12a) forming the motor housing 12 is moved in the axial direction relative to the stator 14 from an axial-directional end surface of the stator 14, and the stator 14 is inserted into the housing section 12 (12a) while causing the radially outer most thermally conductive sheet 20a of the plurality of thermally conductive sheets 20a to be in slidable contact with the inner peripheral surface of the housing section 12 (12a) (insertion step S14).

According to this embodiment, in the first placement step S12, the plurality of thermally conductive sheets 20a are placed so as to be offset in the axial direction, and in the insertion step S14, the stator 14 is inserted into the housing section 12 (12a) while causing the radially outermost thermally conductive sheet 20a to be in slidable contact with the inner peripheral surface of the housing section 12 (12a), whereby it is possible to align the axial-directional end surfaces of the thermally conductive sheets 20a in the radial direction naturally after assembling, thanks to the friction force between the housing section 12 (12a) and the radially outermost thermally conductive sheet 20a, and the mutual friction force of the thermally conductive sheets. Accordingly, in the insertion step S14, it is possible to assemble the thermally conductive sheets 20a so that the axial-directional end surfaces are flush without extra works.

Furthermore, the shape, size, and thickness of the laminated body 20 can be adjusted easily, and it is possible to place the laminated body 20 in the gap 'c' in the radial direction between the motor housing 12 and the stator 14 easily in accordance with the shape and size of the gap 'c' in the radial direction.

Furthermore, when performing assembly of inserting the stator into the motor housing with the laminated body 20 being interposed between the motor housing 12 and the stator 14, it is possible to insert the stator into the motor housing easily by utilizing the slidability between the thermally conductive sheets 20a, and thus the motor 10 can be assembled easily.

In an embodiment, when producing the motor housing 12, the housing sections 12 (12a, 12b), which are halved sections of the motor housing 12 that are divided in the radial direction, are produced. Further, in the first placement step S12, on the outer peripheral surface of the stator 14, the plurality of thermally conductive sheets 20a are placed offset from one another in the axial direction so that the axial-directional end portions of the thermally conductive sheets 20a are positioned closer toward an axial-directional end surface of the stator 14 that is closer to the housing section 12 (12a), with distance toward the outer side in the radial direction. Next, in the insertion step S14, the stator 14 is inserted into the housing section 12 (12a). Subsequently, the housing section 12 (12b) is butt-joined to the housing section 12 (12a) at the roof portion so as to cover the side where the stator 14 is exposed.

In an embodiment, as depicted in FIG. 1., in the assembling step S10, the axial-directional end portions of the thermally conductive sheets 20a are caused to be in contact with a contact surface 24a formed on the housing section 12 (12a) in a direction orthogonal to the axial direction of the stator 14, so as to align the axial-directional end portions of the respective thermally conductive sheets 20a to be flush in the axial direction of the stator 14.

According to this embodiment, by causing the axial-directional end portions of the thermally conductive sheets 20a to be in contact with the contact surface 24a, it is possible to align the axial-directional end portions of the thermally conductive sheets to be flush in the radial direction reliably.

In an embodiment, as depicted in FIG. 1, the motor 10 includes a contact plate 24 extending downward from the inner peripheral surface of the housing section 12 (12a). The contact plate 24 includes a contact surface 24a facing the open side opposite to the leg portion 26a of the housing section 12 (12a), formed in a direction orthogonal to the axial direction of the stator 14.

In an embodiment, the contact plate 24 extends from the height position of the upper end portion of the stator 14 to the lower side. Further, the axial-directional positions of the thermally conductive sheets 20a with respect to the stator 14 are determined so that the side surface of the upper end portion of the stator 14 is also in contact with the contact surface 24a when the axial-directional positions of the plurality of thermally conductive sheets 20a are in contact with the contact surface 24a.

According to this embodiment, the contact plate 24 has a function to align the axial-directional end portions of the plurality of thermally conductive sheets 20a to be flush, and a function to support and fix the stator 14.

In an embodiment, as depicted in FIG. 5, in the second placement step S16, the thermally conductive sheet 20a or the laminated body 20 is placed on the peripheral surface of one of the motor housing 12 or the stator 14. Next, after the second placement step S16, in the assembling step S10, to one of the motor housing 12 or the stator 14, the other one of the motor housing 12 or the stator 14 is assembled by fitting (fitting step S18). FIG. 4 is a diagram of the motor 10 (10C) according to an embodiment assembled in the fitting step S18.

According to the above method, by assembling the motor housing 12 and the stator 14 by shrink fitting or cold fitting, for instance, the motor housing 12 does not need to be produced as halved sections even in a case where the laminated body 20 is to be placed on the peripheral surface of one of the motor housing 12 or the stator 14, whereby it is possible to assemble the motor easily.

In an embodiment, in a case where the fitting step S18 is performed, as depicted in FIG. 4, a motor housing 12 having only one leg portion 26a is produced. Then, the stator 14 is inserted from the open side without the leg portion 26a. Subsequently, a leg portion 26b is placed at the open side, and assembled to the motor housing 12.

In an embodiment, in the fitting step S18, as depicted in FIG. 4, the thermally conductive sheet 20a or the laminated body 20 is placed in the recess portion 14a having an arc shape or an annular shape formed on the outer peripheral surface of the stator 14.

According to this embodiment, by placing the thermally conductive sheet 20a or the laminated body 20 in the recess portion 14a, it is possible to fix the thermally conductive sheet 20a or the laminated body 20 at a desired position on the outer peripheral surface of the stator 14 without misplacement, when producing the motor.

In an embodiment, in the fitting step S18, the motor housing 12 and the stator 14 are assembled by shrink fitting (shrink fitting step S20). That is, after heating and thermally expanding the motor housing 12, the stator 14 is inserted into the motor housing 12, and then the temperature of the motor housing 12 is changed back to the normal temperature and the motor housing 12 is thermally shrunken, so that the gap 'c' in the radial direction is filled with the thermally conductive sheet 20a or the laminated body 20.

According to this embodiment, it is possible to assemble the motor 10 (10C) without producing the housing sections 12 (12a, 12b) depicted in FIG. 1.

In an embodiment, like the motor 10 (10C) depicted in FIG. 4, a slightly larger motor housing 12 for shrink fitting is produced so as to ensure a large gap 'c' in the radial direction between the motor housing 12 and the stator 14. Further, the thermally conductive sheet 20a or the laminated body 20 is placed on the outer peripheral surface of the stator 14, and shrink fitting is performed so that the inner peripheral surface of the motor housing 12 is in stable contact with the upper surface of the thermally conductive sheet 20a or the laminated body 20.

In an embodiment, in the shrink fitting step S20, as depicted in FIG. 4, the thermally conductive sheet 20a or the laminated body 20 is placed in the recess portion 14a having an arc shape or an annular shape formed on the outer peripheral surface of the stator 14.

According to this embodiment, by placing the thermally conductive sheet 20a or the laminated body 20 in the recess portion 14a, it is possible to fix the thermally conductive sheet 20a or the laminated body 20 at a desired position on the outer peripheral surface of the stator 14 without misplacement, when producing the motor 10 (10C).

In an embodiment, the thermally conductive sheets 20a are laminated to be a little thicker to form a thicker laminated body 20, and then the laminated body 20 is inserted into the recess portion 14a. Accordingly, it is possible to bring the upper surface of the laminated body 20 into close contact with the inner peripheral surface of the motor housing 12, and bring the lower surface of the laminated body 20 into close contact with the upper surface of the stator 14.

In an embodiment, as depicted in FIG. 5, in the fitting step S18, the stator 14 is inserted into the motor housing 12 while being cooled and thermally shrunken, and then the stator 14 is changed back to the normal temperature and thermally expanded, so that the gap 'c' in the radial direction is filled by the thermally conductive sheet 20a or the laminated body 20 (cold fitting step S22).

According to this embodiment, it is also possible to assemble the motor 10 (10C) without producing the housing sections 12 (12a, 12b) depicted in FIG. 1.

INDUSTRIAL APPLICABILITY

According to some embodiments, it is possible to achieve a motor that is capable of improving both of the motor cooling effect and the vibration suppression effect, and simplify the steps of producing the motor.

REFERENCE SIGN LIST 10 (10A, 10B, 10C) Motor
12 Motor housing 12 (12a, 12b) Housing Section
14 Stator
14a Recess portion
16 Rotational shaft
18 Rotor
20 Laminated body
20a Thermally conductive sheet
22 Cooling passage
24 Contact plate
24a Contact surface
26a, 26b Leg portion
w Cooling medium

The invention claimed is:

1. A motor comprising:
a motor housing;
a stator disposed inside the motor housing and supported by the motor housing; and
a first thermally conductive sheet layer disposed so as to fill a gap in a radial direction between the motor housing and the stator;
a second thermally conductive sheet layer disposed so as to fill a gap in an axial direction between the motor housing and the stator
wherein the motor housing includes:
a first section; and
a second section disposed next to the first section in the axial direction, and wherein the:
first thermally conductive sheet layer is disposed in the gap in the radial direction between an inner peripheral surface of the first section and an outer peripheral surface of the stator, the first thermally conductive sheet layer having a first front surface and a first reverse surface each extending axially along the inner peripheral surface and the outer peripheral surface such that the first front surface and the first reverse surface are in contact with the inner peripheral surface and the outer peripheral surface, respectively, and
wherein the second thermally conductive sheet layer is disposed in the gap in the axial direction between the second section and the stator, the second thermally conductive sheet layer having a second front surface and a second reverse surface each extending radially along an inner side surface of the motor housing formed by the second section and a side surface of the stator such that the second front surface and the second reverse surface are in contact with the inner side surface and the side surface, respectively.

2. The motor according to claim 1, wherein each of the first thermally conductive sheet layer and the second thermally conductive sheet layer comprises a graphite sheet.

3. The motor according to claim 1, wherein each of the first thermally conductive sheet layer and the second thermally conductive sheet layer comprises a plurality of thermally conductive sheets which are laminated so as to be slidable on one another, the plurality of thermally conductive sheets forming a laminated body as said each of the first thermally conductive sheet layer and the second thermally conductive sheet layer.

4. The motor according to claim 1, wherein the motor housing has a passage to which a cooling medium is to be supplied, the passage being formed on the motor housing at an outer side, in the radial direction or the axial direction, of one of the first thermally conductive sheet layer or the second thermally conductive sheet layer.

5. The motor according to claim 1, wherein one of the first thermally conductive sheet layer or the second thermally conductive sheet layer comprises a plurality of thermally conductive sheets disposed discretely on a part of an axial-directional end surface or an outer peripheral surface of the stator, and
wherein the motor housing has a passage to which the cooling medium is to be supplied, the passage being formed on the motor housing at an outer side, in the radial direction or the axial direction, of each of the plurality of thermally conductive sheets.

6. The motor according to claim 1, wherein a recess portion having an arc shape or an annular shape is formed on an outer peripheral surface or an axial-directional end surface of the stator, and wherein one of the first thermally conductive sheet layer or the second thermally conductive sheet layer is disposed in the recess portion.

7. The motor according to claim 1, wherein each of the first thermally conductive sheet layer or the second thermally conductive sheet layer has a thermal conductivity of not lower than 0.5 W/(mK).

8. The motor according to claim 1, wherein each of the first thermally conductive layer and the second thermally conductive sheet layer has a tensile modulus of elasticity of not lower than 1000 MPa.

9. A method of producing a motor, comprising:
an assembling step of assembling a stator to a motor housing so that:
a first thermally conductive sheet layer fills a gap in a radial direction between the motor housing and the stator; and
a second thermally conductive sheet layer fills a gap in an axial direction between the motor housing and the stator,
wherein the motor housing includes:
a first section; and
a second section disposed next to the first section in the axial direction, and wherein the assembling step includes:
interposing thee first thermally conductive sheet layer in the gap in the radial direction between an inner peripheral surface of the first section and an outer peripheral surface of the stator, the first thermally conductive sheet layer having a first front surface and a first reverse surface each extending axially along the inner peripheral surface and the outer peripheral surface such that the first front surface and the first reverse surface are in contact with the inner peripheral surface and the outer peripheral surface, respectively; and
interposing thee second thermally conductive sheet layer in the gap in the axial direction between the second section and the stator, the second thermally conductive sheet layer having a second front surface and a second reverse surface each extending radially along an inner side surface of the motor housing formed by the second section and a side surface of the stator such that the second front surface and the second reverse surface are in contact with the inner side surface and the side surface, respectively.

10. The method of producing a motor according to claim 9, further comprising;
a second placement step of placing the first thermally conductive sheet layer on a peripheral surface of one of the motor housing or the stator,
wherein the assembling step includes assembling, after the second placement step, the one of the motor housing or the stator to the other one of the motor housing or the stator by fitting.

11. The method of producing a motor according to claim 10,
wherein the assembling step includes placing the first thermally conductive sheet layer in a recess portion having an arc shape or an annular shape formed on an outer peripheral surface of the stator.

12. A method of producing a motor comprising:
an assembling step of assembling a stator to a motor housing so that;
a first thermally conductive sheet layer fills a gap in a radial direction between the motor housing and the stator, and
a second thermally conductive sheet layer fills a gap in an axial direction between the motor housing and the stator,
wherein the motor housing includes:
a first section; and
a second section disposed next to the first section in the axial direction, and wherein the assembling step includes:
interposing the first thermally conductive sheet layer in the gap in the radial direction between an inner peripheral surface of the first section and an outer peripheral surface of the stator; and
interposing the second thermally conductive sheet layer in the gap in the axial direction between the second section and the stator,
wherein the method further comprises:
a first placement step of laminating a plurality of first thermally conductive sheets to form a laminated body as the first thermally conductive sheet layer, and placing the plurality of first thermally conductive sheets so as to be offset from one another in the axial direction so that axial-directional end portions of the plurality of first thermally conductive sheets are positioned closer to an axial-directional end surface side of the stator with distance toward an outer side in the radial direction,
wherein the assembling step comprises an insertion step of moving the first section relative to the stator in the axial direction from the axial-directional end surface side of the stator, and inserting the stator into the first section while causing a radially outermost first thermally conductive sheet of the plurality of first thermally conductive sheets to be in slidable contact with an inner peripheral surface of the first section.

13. The method of producing a motor according to claim 12,
wherein the assembling step includes causing the axial-directional end portions of the plurality of first thermally conductive sheets to be in contact with a contact surface formed on the first section in a direction orthogonal to the axial direction of the stator, and aligning the axial-directional end portions of the respective first thermally conductive sheets to be flush in the axial direction of the stator.

* * * * *